Oct. 17, 1967 R. L. GATES 3,346,966
GYRO COMPASS MISALIGNMENT MEASURING APPARATUS AND METHOD
Filed March 28, 1962
2 Sheets-Sheet 1
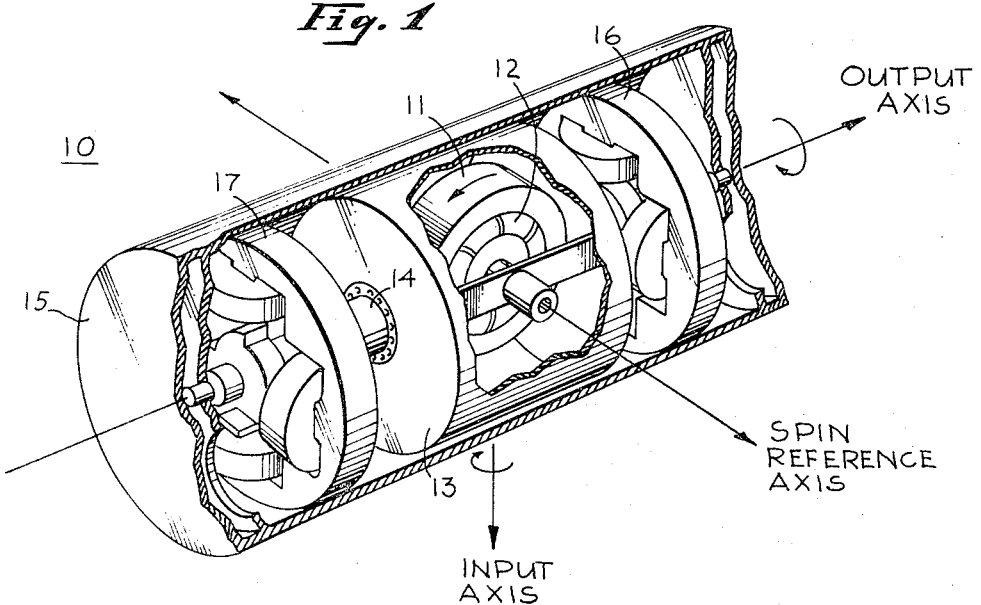
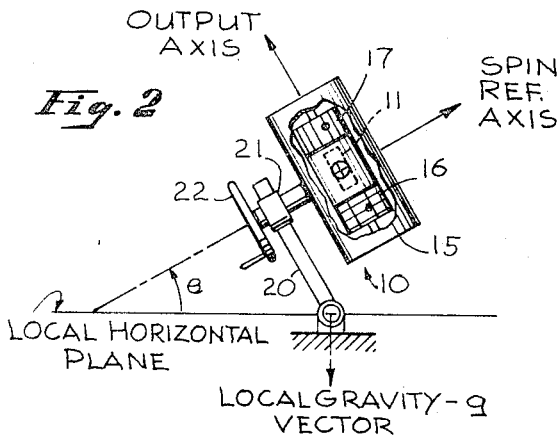
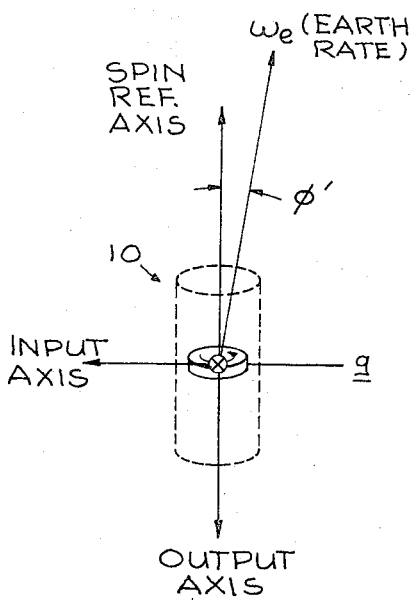
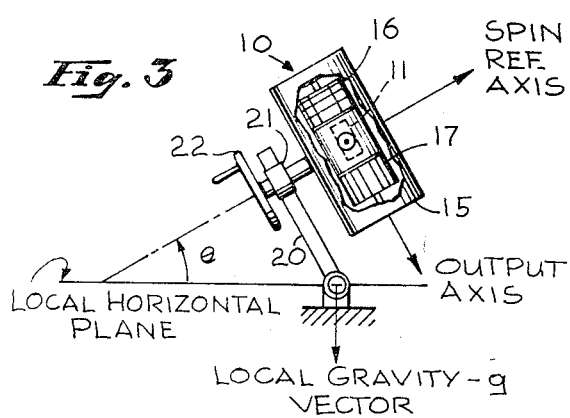
ROBERT L. GATES
INVENTOR.
BY
AGENTS

ROBERT L. GATES
INVENTOR.

United States Patent Office 3,346,966
Patented Oct. 17, 1967

3,346,966
GYRO COMPASS MISALIGNMENT MEASURING APPARATUS AND METHOD
Robert L. Gates, Palos Verdes Estates, Calif., assignor, by mesne assignments, to TRW Inc., a corporation of Ohio
Filed Mar. 28, 1962, Ser. No. 183,139
6 Claims. (Cl. 33—226)

This invention relates generally to a gyro compass application and, more specifically, to a system and method of gyro compassing for determining an accurate azimuth alignment about the local gravity vector, without requiring star sighting or bench marks.

Devices of this caliber have applications in systems requiring the azimuth to be accurately located without utilizing external means and in as short a time as possible. These applications vary from surveying in underground mines to the initial alignment of inertial guidance navigational equipment in either aircraft or missiles. It is well known that inertial navigation is an advanced form of dead reckoning in which the position, velocity, time and orientation of the object such as a missile must be known at the start of a flight and that all velocity and position determinations be made solely within the missile. The basic principle of inertial guidance is relatively simple, in that the missile acceleration relative to a known reference frame is established from an initial orientation and that velocity and position information is obtained by integrating the measured acceleration. This invention is concerned primarily with the means for obtaining the initial orientation and local reference plane with respect to the local azimuth and thereby provide the basis for determining the initial conditions upon which the inertial guidance equipment is to operate. The accuracy of the initial conditions becomes extremely important on long flights.

The prior art of obtaining increased accuracy from gyro compasses has been characterized by the use of special gyro designs involving highly mechanized, ultra precision techniques. The accuracy is directly dependent on the magnitude of the gyro random drift rate and the gyro performance stability after calibration. These devices have produced results when measured at specific latitudes, for example, Los Angeles, that range from about 30 to 120 arc seconds for these gyros. A gyro drift rate of 0.002° per hour yields a 32 arc seconds azimuth uncertainty; whereas, a drift rate of 0.0075° per hour will yield 120 arc seconds azimuth uncertainty.

In this invention a gyro compass system is disclosed that has successfully attained accuracies to within 20 seconds, which is equivalent to a gyro having a drift rate that is less than 0.002° per hour, while using a standard gyro having a 0.03° per hour short term random drift rate. The improved accuracy claimed for this invention is achieved by utilizing a good quality inertial gyro in which the spin axis, output axis, and input axis are at right angles to each other. In the preferred embodiment, a single degree of freedom inertial gyro of the type designed and developed by Charles S. Draper is used. Gyros of this type are now currently being manufactured by the Reeves Instrument Corporation, Minneapolis-Honeywell, and many others. The position of the gyro is determined by first locating the local gravity vector. The gyro input axis is positioned in a local horizontal plane located at right angles to the local gravity vector. The local gravity vector is located for any specific point on the earth surface by conventional means such as a weighted pendulum. The local horizontal plane for any point is defined as being perpendicular to the local gravity vector and is usually determined by a plurality of leveling bubbles set at right angles to each other. In accordance with the present-day terminology, the spin axis refers to the rotating gyro wheel, and the spin reference axis refers to the initially coincident reference axis of the complete gyro. The local gravity vector and the spin reference axis are made to define a first plane which is roughly aligned with the local meridian plane. The spin reference axis is positioned approximately parallel to the earth's rotational axis by moving the spin reference axis an amount equal to its angle from the local meridian. The term local defines the same point of the face of the earth or any other planet in this solar system. The input axis is located in the local horizontal plane, and the total gyro drift rate is measured and preferably recorded. The input axis is reoriented in a second position in said local horizontal plane, which by definition will be substantially 180° from the first position. In the preferred embodiment this is accomplished by rotating the gyro case 180° about the spin axis and in the same direction the gyro wheel is rotating. The drift rate of the gyro in this new position is measured and again preferably recorded. The algebraic difference between the two values of drift rate is used to compute the misalignment of the defined first plane from the local meridian plane. The number of computed misalignment values (N) is repeated at an optimum operating period, so that N calculations of the azimuth angle are obtained for any desired total operating time. A control over the system error (average deviation of the mean error angle) is obtained if a longer operating time is available, since the system error decreases by the factor of $$\frac{1}{\sqrt{N}}$$

as the number of cycles computed increases.

In conventional inertial gyro systems the accuracy of the azimuth location decreases as the operating time increases; whereas, in the present invention the accuracy increases over a longer sampling time. This improvement results from the fact that a calibrating system evolves from the differencing operation, since the differencing operation rejects any significant drift rate changes with a period longer than that of the time between measured drift rate samples. In other words, the uncertainty in computing the azimuth angle due to the gyro random drift is greatly reduced, since the random drift of the gyro is measured over a very short period, depending only on the sampling frequency.

Further objects and advantages of the present invention will be made more apparent by referring now to the accompanying drawings wherein:

FIGURE 1 is a schematic drawing of a single degree of freedom hermetic integrating gyro;

FIGURE 2 illustrates the gyro of FIGURE 1 in the local horizontal plane with the input axis facing west;

FIGURE 3 illustrates the gyro illustrated in FIGURE 1 in the local horizontal plane with the input axis facing east;

FIGURE 4 is a vector diagram illustrating the misalignment or error angle; and

Figure 5:
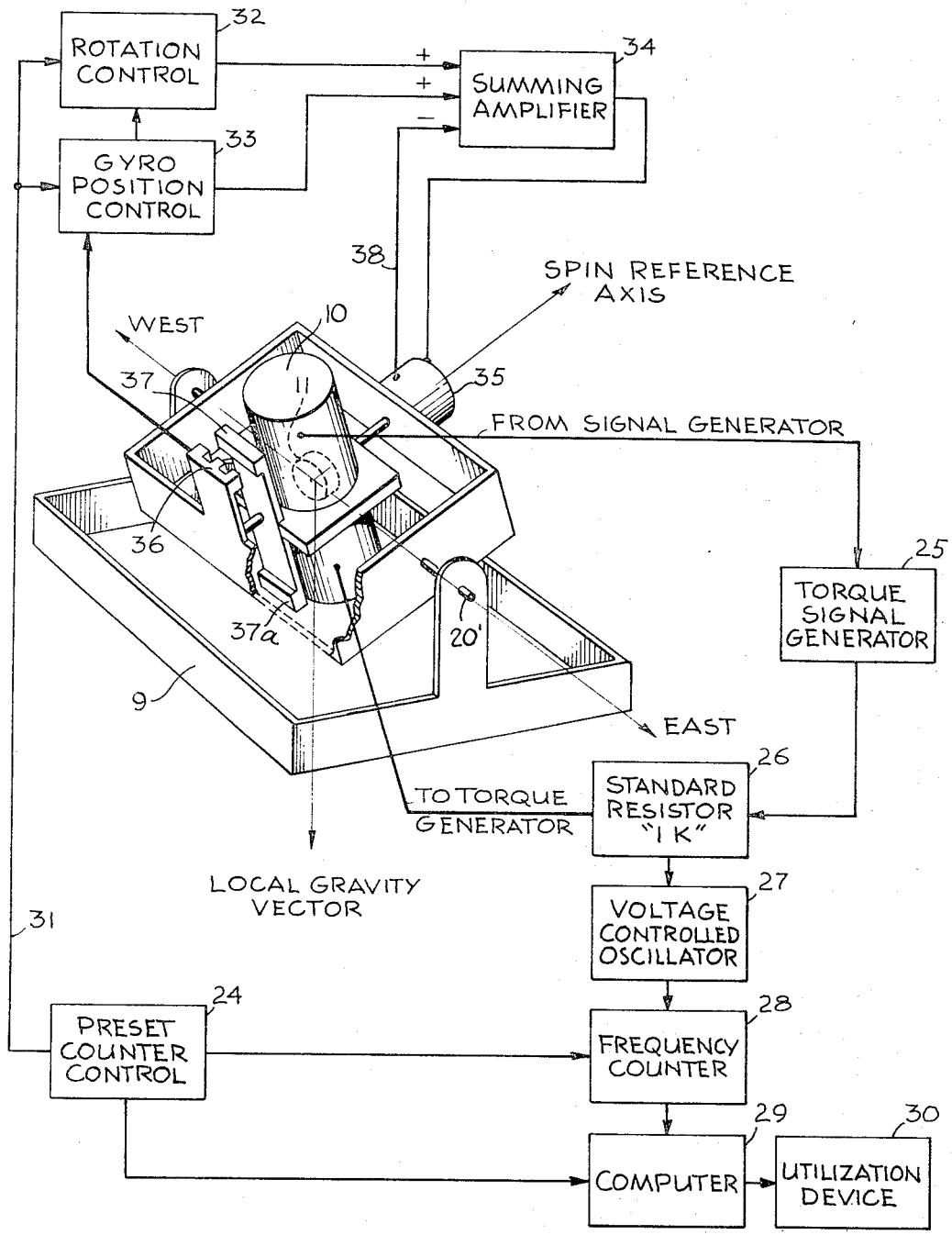
FIGURE 5 is a block diagram illustrating a system for automatically cycling the gyro illustrated in FIGURE 1.

Referring now to FIGURE 1, there is shown a single degree of freedom gyro 10 known also as an HIG gyro for "hermetic integrating gyro." Different commercial versions of the HIG gyro are available and may be used in the practice of this invention. It is realized that different gyros will differ in mechanical details; however, all such gyros will consist of a spinning gyro wheel 11, driven by an electric motor 12. The electric motor 12 is preferably mounted on pre-loaded bearings and is contained in a hermetically sealed float 13. The float 13 is supported by means of a shaft 14 that extends on each side of the float into an outside case 15 that completely encloses the gyro and float. The alignment of shaft 14 with the gyro wheel 11 is such that the shaft also represents the output axis of the gyro. The float 13 is completely submerged in a viscous material having the same average density as the float and shaft 14. In this manner the float 13 has a restrained buoyancy, and no radial forces are carried on the pivots located at either end of the shaft 14. Coaxial with the shaft 14 and located within the case 15 is a signal generator 16, arranged to generate a voltage proportional to the angular displacement of the float 13 with respect to the external case 15. A torque generator 17 is also located within the case 15 and coaxial with the shaft 14. The torque generator is arranged to receive electrical signals for applying a torque to the float 13 in response to a detected output from the signal generator 16.

The operation of the gyro can best be explained by referring to the three axes about which the gyro operates. For example, the spin axis lies along the angular momentum vector of the gyro wheel 11 when the output of the signal generator 16 is zero. The output axis is coaxial with the shaft 14 and is normal to the spin axis. The float 13 is free to turn about the output axis. The input axis is normal to the output axis and the spin axis as indicated. The projection of the spin axis will intersect the case 15 and generate a line known as the spin reference axis of the gyro. In other words in the null output condition the case axis will coincide with the spin axis of the gyro wheel and shall define the spin reference axis. In operation, an output is indicated as a movement of the float 13, relative to the case 15, thereby resulting in a voltage from the signal generator 16. This operation is explained by the fact that whenever a torque is applied to a spinning wheel so as to change the direction of the spin axis, the spin axis will tend to align itself with the torque vector. In the HIG gyro 10, movement of the case 15 about the input axis causes a forced precession of the gyro wheel 11 about the output axis. The gyro wheel 11 thus exerts a torque on the float 13 about the output axis, which is counterbalanced by a current passed through the torque generator 17. Whenever the gyro is electrically caged at null, angular rates (such as a component of earth rate) may be measured electrically by observing the magnitude of current in the torque generator required to keep the gyro float at electrical null. Electrical null is defined as the coincidence of the gyro wheel spin axis and gyro spin reference axis.

Torques other than the gyroscopic element, viscous drag and float inertial torques can act about the output axis. They may arise from two sources, intentionally applied through the torque generator and unintentionally applied by various disturbances. These torques result in output signals which are indistinguishable from those caused by input angular rates. These other forces therefore act to change the reference orientation of the gyro at a rate proportional to the torque. If the torques are caused by such things as float unbalance, signal generator reaction, fluid convection currents, etc., the resulting output signal looks like an input angular rate and is called the drift rate of the gyro. This drift rate is the basic performance figure of merit for inertial navigational use. The lower the drift rate, the better the attitude reference is maintained and the more accurate the guidance system.

Referring now to FIGURE 2, there is shown an HIG gyro 10 mounted on a suitable cradle 20 for positioning the spin reference axis of the gyro 10 parallel to the spin axis of the earth. Expressed in another way, the spin reference axis of the gyro is elevated at the local latitude angle identified by angle $\beta$. The gyro 10 is electrically caged at a null in this position. Cradle 20 is mechanized with a precision bearing 21 for allowing a suitable rotating device such as a handle 22 to rotate the gyro case 15 about the spin reference axis of the gyro 10. In operation, the gyro 10 is initially positioned and electrically caged at null with the spin reference axis substantially parallel to the rotational axis of the earth and the input axis in the local horizontal plane and facing either east or west. In FIGURE 2 the input axis is assumed to be west and facing into the paper. In this configuration a current is passed through the torque generator 17 in order to electrically null any output from the signal generator 16 in order to align the spin axis of the gyro wheel 11 with the spin reference axis of the gyro. In the preferred embodiment this torque current is measured and recorded using digital techniques. Referring now to FIGURE 3, the gyro 10 is rotated 180° about the spin axis by means of the handle 22 to thereby place the input axis again in the local horizontal plane but now in a second position facing east. In this configuration the input axis will be pointing normal to the paper facing the reader. A torque current is then sent through the torque generator 17 to null the output from the signal generator 15. This torque current is again measured and recorded as mentioned above. This repositioning operation is repeated continuously and unidirectionally as determined by the accuracy desired and the time available. It should be pointed out, however, that the torque current is not measured while the gyro is being rotated about its spin axis. The measured torque current is used as a measure of the gyro drift rate by utilizing a scale factor associated with each gyro.

Referring now to FIGURE 4, there is shown a plane defined by the angle $\phi'$ between the spin reference axis and the local gravity vector $g$ (shown into the paper) and the local meridan plane. The angle $\phi'$ is more properly termed a misalignment or error angle and may be calculated by algebraically differencing the gyro drift rates obtained with the input axis in the east and west positions by solving the following equation:

$$\phi' = \frac{\omega_{T_E} - \omega_{T_W}}{2\omega_e \cos \beta}$$

where:

$\phi'$ = angle between spin reference axis and meridian plane (radians)
$\omega_{T_{E(W)}}$ = total gyro drift rate with the input axis east (west) (°/hr.)
$\omega_e$ = earth rate (15°/hr.)
$\beta$ = latitude angle The differencing operation rejects any gyro drift rate changes with a period longer than the time between rotations of 180 degrees which in the preferred embodiment was between 2 and 5 minutes. As a result, the system is self-calibrating during operation, and the usual day-to-day and hour-to-hour drift rate changes were automatically compensated for.

Referring now to FIGURE 5, there is shown a preferred mechanization of the necessary servo loops for automatically controlling the HIG gyro 10. The system mounted on base 9 and adapted to be rotated about the east-west pivoted gimbal 20' is comprised of two basic servo loops, the first loop being used to measure the torque current necessary to align the spin axis with the spin reference axis, and the second loop being used to control the rotation of the gyro 10 about the spin reference axis in accordance with the principles of this invention. A preset counter control 24 is used to sequence and time each operation. In one embodiment a time of 100 seconds each was allowed for obtaining readings with the input axis pointed west and east. An additional 25 seconds was allowed for rotating the gyro case about the spin reference axis from west to east. The total time for achieving the first pair of readings was therefore programmed for 225 seconds to receive east and west information. Since all subsequent runs require only an additional input from either east or west, the time needed for each additional run (reversal and reading) would be 125 seconds.

In accordance with the principles of this invention the HIG gyro 10 is positioned in such a manner that the spin reference axis, together with the local gravity vector, defines a first plane. The local gravity vector may be obtained by means of a pendulum commonly used in the surveying art. A local horizontal plane perpendicular to the local gravity vector is then considered to be the horizontal plane at that point on the periphery of the earth. The spin reference axis is initially elevated to the local latitude angle β with respect to the local horizontal plane. The initial conditions are satisfied after the defined first plane is approximately aligned with the local meridian plane and the gyro electrically caged. The input axis may be initially aligned in either the east or west direction. With the input axis initially aligned, for example, facing west, the misalignment of the rotating gyro wheel is detected by a signal from the signal generator which results in a torque current being fed to the torque generator to thereby align the spin axis with the spin reference axis. The average value of torque current is measured over a given period of time as a measure of the gyro drift rate. The input axis is then reversed. With the input axis facing east, the torque current is again measured over the same given time interval. During the reading operation, a signal from the signal generator is fed to torque signal generator 25 which feeds the torque coil in the gyro 10. The torque current is passed through a standard resistor 26, for example, 1000 ohms, to thereby convert the torque current to a voltage. The varying voltage developed across the standard resistor 26 is detected by a voltage controlled oscillator 27, which converts the voltage to a frequency. The frequency generated by the voltage-controlled oscillator 27 is accurately measured by means of a frequency counter 28 that is gated On by the preset counter control 24. After the frequency counter 28 has been On for 100 seconds, it is disabled by the preset counter 24 and prevented from recording additional information. The output of the frequency counter 28 is fed into a computer 29, also gated by the preset counter control 24, that accepts the summations of counts for each run and divides the total by the number of runs, for both east and west readings. These two average readings may be algebraically differenced, averaged, and the result multiplied by a gyro scale factor in that order; or each average reading may be multiplied by the gyro scale factor, and then algebraically differenced. The results in either case will be the same. The output of the computer 29 feeds a utilization device 30 that can be either a guidance system or simply a printed readout of angle error.

A signal from the preset counter 24 is sent along line 31 to a rotation control 32 and a gyro position control 33. The rotation control 32 energizes a summing amplifier 34, which is connected to a suitable motor 35 for rotating the gyro 10 about its spin reference axis at a preferably constant speed. The gyro position control 33 is simultaneously deactivated. The gyro position control 33 is in circuit with a positioning device, for example, an E pick-off 36, which is arranged to accurately locate a suitable iron slug 37, which rotates on the same base as the gyro 10. A second slug 37a is located 180 degrees from the first slug 37 to position the gyro 10 in the second position. A tachometer output from the motor 35 is fed along line 38 back into the summing amplifier 34, as a feed back means for controlling the speed of the motor 35. The gyro 10 is rotated by the motor 35 until the iron slug 37a approaches the E pick-off 36, at which point a voltage signal is induced in the E pick-off and fed into the gyro position control 33. This signal causes the gyro position control 33 to feed a disabling signal into the rotation control 32. The gyro position control 33 receives a signal from the E pick-off 36 for accomplishing the final positioning of the slug 37a.

In the embodiment described the rotation of the gyro 10 takes approximately 4 seconds, and the preset counter control 24 is adjusted to allow approximately 25 seconds for the rotation, locking and settling of transients caused by the rotation of the gyro 10. After the 25 seconds have elapsed, the preset counter 24 gates the counter 28 into an On condition for exactly 100 seconds, while the drift rate is recorded with the input axis facing east. The first complete reading of a west and east operation is preset to take exactly 225 seconds, which allows 100 seconds for each reading and 25 seconds for rotating the gyro 10. By increasing the number of readings in the east and west direction and thereby obtaining additional error angles, it will be appreciated that the total accuracy in measuring the average error angle may be increased by the well known statistical formula, $$\text{error angle measurement error} = \frac{\text{standard deviation of error angle readings}}{\sqrt{\text{number of readings}}}$$

The improvements claimed for the present invention result from the algebraic cancellation of gyro drift coefficients when the gyro 10 is rotated 180 degrees about its spin axis from east to west. Mathematically it can be shown that by considering an HIG gyro maintained in a closed loop operation in which the float angular displacement from null and float rates about the output axis approach zero that the total equivalent gyro drift rate $\omega_T$ will be composed as follows:

$$\omega_T = K_\omega i_C = \omega_{IA} + R + (U_I + U_{OA})a_S + (2Ka_S - U_S)a_I + \delta\omega \quad (3)$$

where:

$K_\omega^* =$ torque generator scale factor $$\left(\frac{\text{deg./hr.}}{\text{ma.}}\right)$$

$\omega_{IA} =$ angular velocity of gyro case about the input axis (deg./hr.)

$R =$ fixed drift coefficient (deg./hr.)

$U_I =$ unbalanced drift coefficient along input axis $$\left(\frac{\text{deg./hr.}}{\text{g.}}\right)$$

$U_S =$ unbalance drift coefficient along spin axis $$\left(\frac{\text{deg./hr.}}{\text{g.}}\right)$$

$U_{OA} =$ unbalance drift coefficient along float output axis $$\left(\frac{\text{deg./hr.}}{\text{g.}}\right)$$

(not normally considered)
$K =$ compliance drift coefficient $$\left(\frac{\text{deg./hr.}}{\text{g.}}\right)$$

$a_I$, $a_S =$ linear acceleration components along input axis and spin axis respectively (g.)
$\delta\omega =$ "random" drift (deg./hr.)
$i_C =$ current in the torque generating coils (ma.)

Solving for the measured value of torque current and with the gyro positioned facing east:

$$\omega_E = K_\omega I_{CE} = \omega_{IA_\phi} + R + (U_I + U_{OA})a_S + (2Ka_S - U_S)a_I + \delta\omega_E \quad (4)$$

where:

$\omega_W = \omega_{IA} =$ earth rate component due to misalignment of spin axis from meridian plane Rotating the input axis 180 degrees about the case spin reference axis, $$\omega_W = K_\omega I_{CW} = \omega_{IA_\phi} + R + (U_I + U_{OA})a_S + (2Ka_S - U_S)a_I + \delta\omega_W \quad (5)$$

The mechanical rotation will place the input axis near the horizontal plane in each orientation within an uncertainty tolerance $\Delta\theta$, therefore, $a_I$ will be random in

---

*All coefficients are equivalent *input axis* rates.

sign. Note the change in sign if the earth rate component.

Differencing Equations 4 and 5, $$\omega_E - \omega_W = K_\omega(I_{C_E} - I_{C_W}) = 2\omega_{IA_\phi} + \delta\omega_E - \delta\omega_W \quad (6)$$

and replacing $a_I$ with $g \sin \Delta\theta$, $$K_\omega(I_{C_E} - I_{C_W}) = 2\omega_{IA_\phi} + [g(2Ka_S - U_S)(\sin \Delta\theta_E - \sin \Delta\theta_W) + \delta\omega_E - \delta\omega_W] \quad (7)$$

Solving for the earth rate component, $$\omega_{IA_\phi} = \frac{(I_{C_E} - I_{C_W})K_\omega - [g(2Ka_S - U_S)(\sin \Delta\theta_E - \sin \Delta\theta_W) + \delta\omega_E - \delta\omega_W]}{2} \quad (8)$$

Thus, the earth rate component introduced to the gyro through the misalignment angle $\theta$ is proportional to the difference of torque current east and torque current west plus an error term. Using the torque scale factor and earth rate and resolving the angle $\theta$ into the horizontal plane, for small angles, $$\phi' = \frac{\omega_{IA_\phi}}{\omega_e \cos \beta} = \frac{(I_{C_E} - I_{C_W})K_\omega}{2\omega_e \cos \beta}$$

$$- \frac{[g(2Ka_S - U_S)(\sin \Delta\theta_E - \sin \Delta\theta_W) + \delta\omega_E - \delta\omega_W]}{2\omega_e \cos \beta} \quad (9)$$

where, $\phi'$ = horizontal plane projection of the misalignment of the gyro spin axis from the meridian plane (radians)
$\omega_e$ = earth rate (15.04 deg./hr.)
$\beta$ = latitude angle The last term in Equation 9 contains the error component which is less than 20 arc seconds (0.00125°/hr.) equivalent uncertainty drift rate. Finally, disregarding the last term, $\phi'$ is calculated using the following equation:

$$\phi' = \frac{(I_{C_E} - I_{C_W})K_\omega}{2\omega_e \cos \beta} \quad (10)$$

This computed value $\phi$ represents the azimuth angle of interest. Its value may be used as an error signal to position the gyro compass so that the gyro spin axis is in the meridian plane or, using digital techniques, may be used as an azimuth correction signal (coordinate rotation) to be transmitted directly into an inertial guidance computer.

Of particular significance is the cancellation of the fixed drift (R) term and the input axis unbalance term ($U_I$) and the output axis unbalance term ($U_{OA}$) with the differencing of Equations 4 and 5. This occurrence eliminates the effects of changes in these gyro drift coefficients, except during the very short cycle of operation time. Additionally, the value of $g \sin \Delta\theta$ appearing in Equation 9, is quite small so that the system is quite insensitive to the magnitude of or changes in the compliance coefficient (K) and unbalance along the spin axis ($U_S$).

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
a single inertial gyro having a spin reference axis and an input axis at right angles to each other,
said spin reference axis and a local gravity vector defining a first plane,
means for supporting said spin reference axis in said first plane at the local latitude angle with respect to a local horizontal plane perpendicular to said local gravity vector and with said first plane in alignment with the local meridian plane,
means for locating said input axis in a first position in said local horizontal plane,
means for locating said input axis in a second position in said local horizontal plane,
means for measuring the total gyro drift rate of said gyro with said input axis in said first position and in said second position,
and means responsive to said gyro drift rate in said first position and said second position for determining the misalignment of said first plane with respect to said local meridian plane.

2. In combination,
an inertial gyro having a spin reference axis and an input axis at right angles to each other,
said spin reference axis and a local gravity vector defining a first plane,
means for supporting said spin reference axis at the local latitude angle with respect to a local horizontal plane perpendicular to said local gravity vector and with said first plane in alignment with the local meridian plane,
means for locating said input axis in a first position in said local horizontal plane,
means for rotating said gyro about said spin reference axis in the direction of spin of said gyro to bring said input axis to a second position in said local horizontal plane,
means for measuring the total gyro drift rate of said gyro with said input axis in said first position and in said second position,
and means responsive to said gyro drift rate in said first position and said second position for determining the misalignment of said first plane with respect to said local meridian plane.

3. In combination,
a single inertial gyro comprising a spinning gyro wheel, a signal generator and a torque generator,
said inertial gyro having a spin reference axis and an input axis at right angles to each other,
said spin reference axis and a local gravity vector defining a first plane,
means for supporting said spin reference axis at the local latitude angle with respect to a local horizontal plane perpendicular to said local gravity vector and with said first plane in alignment with the local meridian plane,
means for locating said input axis in a first position in said local horizontal plane,
means responsive to a signal from said signal generator for generating and feeding a current signal through said torque generator,
means for locating said input axis in a second position in said local horizontal plane,
means for measuring said current signal over a given period of time as a measure of the total gyro drift rate of said spinning gyro wheel with said input axis in said first position and in said second position,
and means responsive to said gyro drift rate in said first position and said second position for determining the misalignment of said first plane with respect to said local meridian plane.

4. In combination,
an inertial gyro comprising a spinning gyro wheel, a signal generator, and a torque generator,
said inertial gyro having a spin reference axis and an input axis at right angles to each other,
said spin reference axis and a local gravity vector defining a first plane,
means for supporting said spin reference axis at the local latitude angle with respect to a local horizontal plane perpendicular to said local gravity vector and with said first plane in alignment with the local meridian plane, means for locating said input axis in a first position in said local horizontal plane, means responsive to a signal from said signal generator for generating and feeding a current signal through said torque generator, said torque generator exerting a torque on said rotating gyro wheel for aligning the spin axis of the gyro wheel with said spin reference axis of said gyro, means for converting said torque current signal to a voltage signal, means for generating a signal varying in frequency in response to said voltage signal, means for locating said input axis in a second position in said local horizontal plane, means for measuring the frequency variations of said signal over a given period of time as a measure of the total gyro drift rate of said gyro with said input axis in said first position and in said second position, and means responsive to said gyro drift rate in said first position and said second position for determining the misalignment of said first plane with respect to said local meridian plane.

5. In combination, a single inertial gyro having a spin reference axis and an input axis at right angles to each other, said spin reference axis and a local gravity vector defining a first plane, means for supporting said spin reference axis in said first plane at the local latitude angle with respect to a local horizontal plane perpendicular to said local gravity vector and with said first plane in alignment with the local meridian plane, means for locating said input axis in a first position in said local horizontal plane, means for locating said input axis in a second position in said local horizontal plane, means for measuring the total gyro drift rate of said gyro with said input axis in said first position and in said second position, means for repetitively measuring the gyro drift rate with the input axis in said first position and said second position, and means for algebraically differencing the average measurements of said gyro drift rate determined from said first position and said second position to thereby determine the misalignment of said first plane with respect to said local meridian plane.

6. In combination, a single degree of freedom inertial gyro comprising a spinning gyro wheel, a signal generator and a torque generator, said inertial gyro having a spin reference axis and an input axis at right angles to each other, said spin reference axis and a local gravity vector defining a first plane, means for supporting said spin reference axis at the local latitude angle with respect to a local horizontal plane perpendicular to said local gravity vector and with said first plane in alignment with the local meridian plane, means for locating said input axis in a first position in said local horizontal plane, means responsive to a signal from said signal generator for generating and feeding a current signal through said torque generator, said torque generator exerting a torque on said spinning gyro wheel for aligning the spin axis of the gyro wheel with said spin reference axis of said gyro, means for converting said torque current signal to a voltage signal, means for generating a signal varying in frequency in response to said voltage signal, means for rotating said gyro about said spin reference axis in the direction of spin of said spinning gyro wheel to a second position that is substantially 180 degrees from said first piston, means for measuring the frequency variations of said signal over a given period of time as a measure of the total gyro drift rate of said gyro with said input axis in said first position and in said second position in the same manner as measured for said first position, means for repetitively measuring the gyro drift rate with the input axis in said first position and said second position, and means for algebraically differencing the average of said gyro drift rates determined from said first position and said second position to thereby determine the misalignment of said first plane with respect to said local meridian plane.

References Cited
UNITED STATES PATENTS

| | | | |
|---|---|---|---|
| 2,972,195 | 2/1961 | Campbell et al. | 33—226 |
| 2,988,818 | 6/1961 | Madden et al. | 33—204 |
| 3,222,795 | 12/1965 | Gevas | 33—226 |

ROBERT B. HULL, *Primary Examiner.*